(12) United States Patent
Premraj

(10) Patent No.: US 9,289,089 B1
(45) Date of Patent: Mar. 22, 2016

(54) MULTI-USE PAN SYSTEM

(71) Applicant: Upkar C. Premraj, Lutz, FL (US)

(72) Inventor: Upkar C. Premraj, Lutz, FL (US)

(*) Notice: Subject to any disclaimer, the term of this patent is extended or adjusted under 35 U.S.C. 154(b) by 0 days.

(21) Appl. No.: 14/624,969

(22) Filed: Feb. 18, 2015

Related U.S. Application Data

(60) Provisional application No. 61/941,776, filed on Feb. 19, 2014.

(51) Int. Cl.
*A47J 37/01* (2006.01)
*A47J 27/13* (2006.01)
*B65D 21/02* (2006.01)
*B65D 81/34* (2006.01)
*B65D 6/04* (2006.01)

(52) U.S. Cl.
CPC ............ *A47J 27/13* (2013.01); *B65D 21/0204* (2013.01); *B65D 81/34* (2013.01)

(58) Field of Classification Search
CPC ............ B65D 21/083; B65D 11/1875; B65D 21/0204; B65D 81/34; A47J 36/00; A47J 37/01; A47J 27/13
USPC ............................ 220/573.1, 4.26, 4.27, 759
See application file for complete search history.

(56) References Cited

U.S. PATENT DOCUMENTS

| | | | | | |
|---|---|---|---|---|---|
| 561,167 | A | * | 6/1896 | Jennings | 220/8 |
| 848,698 | A | * | 4/1907 | Smith | 220/4.03 |
| 1,577,823 | A | * | 3/1926 | Dolle | 220/4.27 |
| 2,814,409 | A | * | 11/1957 | Perez | 220/4.26 |
| 2,826,333 | A | * | 3/1958 | Rodemich | 294/161 |
| 2,907,486 | A | * | 10/1959 | Perez | 220/4.26 |
| 3,987,541 | A | * | 10/1976 | Sieczkiewicz | 30/114 |
| 4,028,806 | A | * | 6/1977 | Sheldon | 30/290 |
| 4,222,493 | A | * | 9/1980 | Friedman | 220/8 |
| 4,428,145 | A | * | 1/1984 | Wheeler | 43/55 |
| 8,534,188 | B1 | * | 9/2013 | Winfield | 99/357 |
| 2007/0131681 | A1 | * | 6/2007 | Pawlowski | 220/4.26 |
| 2014/0050833 | A1 | * | 2/2014 | Stith | 426/509 |

* cited by examiner

*Primary Examiner* — Mickey Yu
*Assistant Examiner* — Niki Eloshway

(57) ABSTRACT

A primary module has a base with a periphery. The primary module has a base side wall with a lower edge formed integrally with the periphery of the base. The primary module has a base flange in an annular configuration with an inner edge formed integrally with the upper edge of the base side wall. Supplemental modules each have a supplemental side wall with an upper edge, a lower edge, an upper flange, and a lower flange. Each upper flange has an inner edge integrally formed with the upper edge of an associated supplemental side wall. Each lower flange has an inner edge integrally formed with the lower edge of the associated supplemental side wall. A coupling assembly secures together the primary module and the supplemental modules during use.

4 Claims, 4 Drawing Sheets

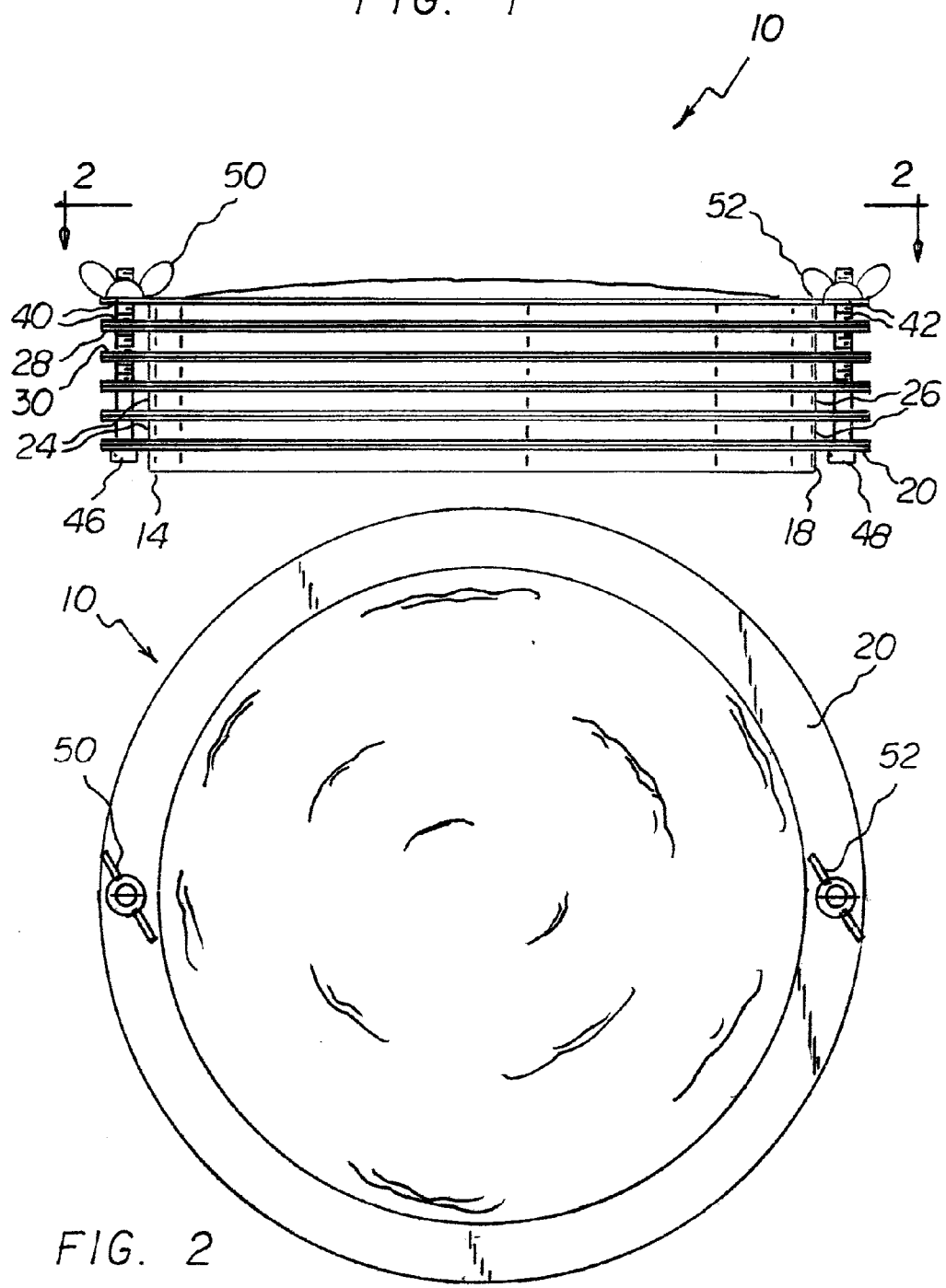

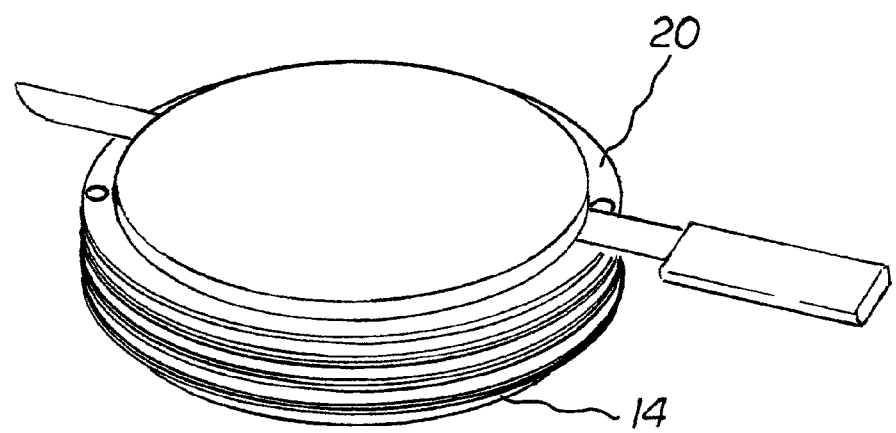
FIG. 3
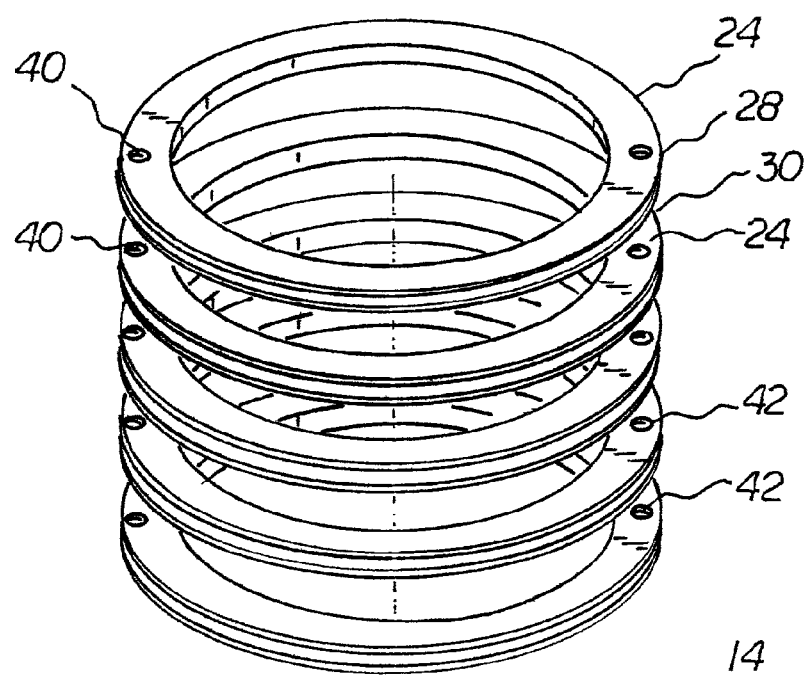
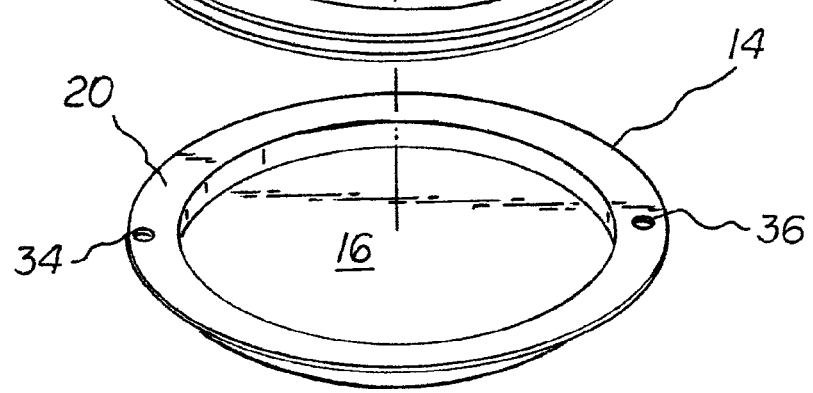
FIG. 4

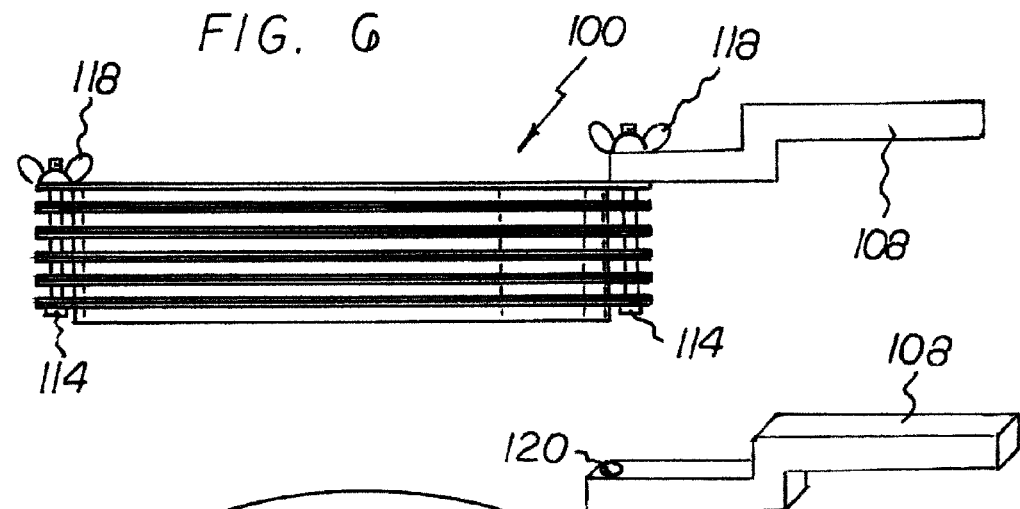
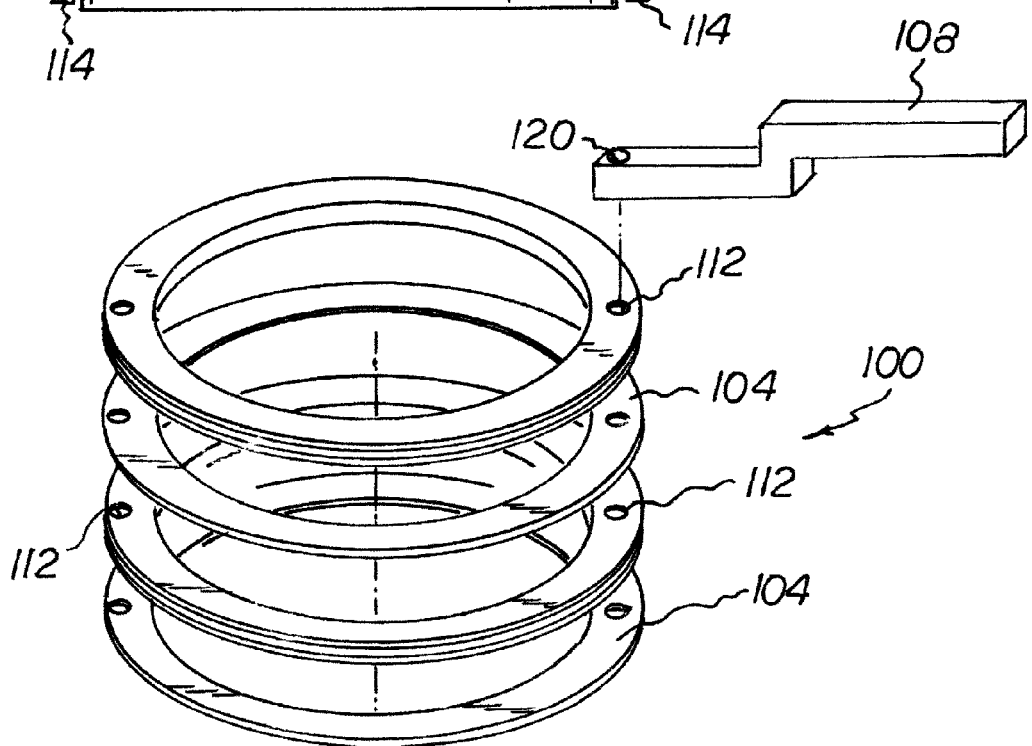

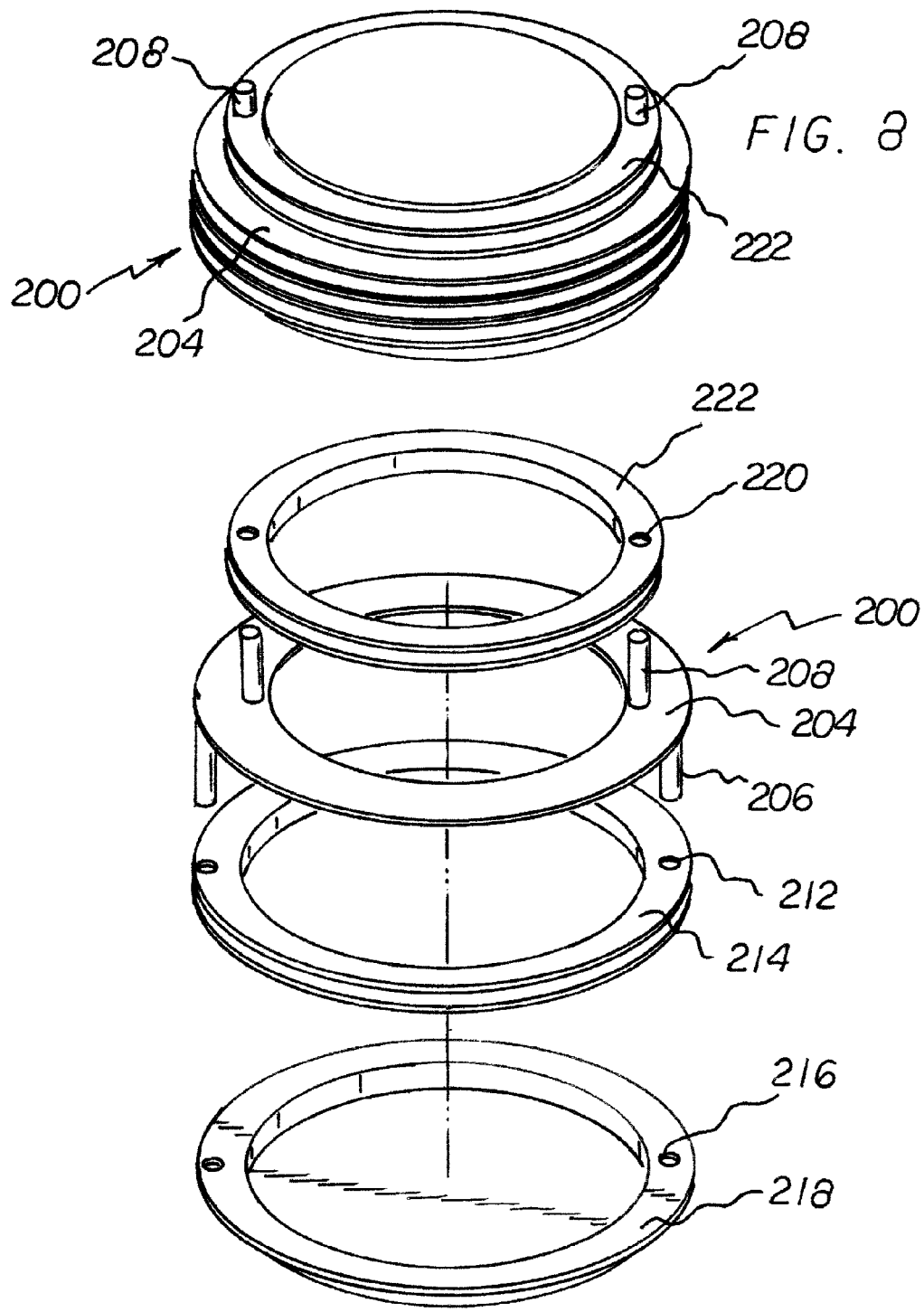

MULTI-USE PAN SYSTEM

RELATED APPLICATION

The present non-provisional application is based upon Provisional Application No. 61/941,776 filed Feb. 19, 2004, the subject matter of which is incorporated herein by reference.

BACKGROUND OF THE INVENTION

1. Field of the Invention

The present invention relates to a multi-use pan system and more particularly pertains to baking a cake of any of a plurality of preselected heights and for cutting the baked cake at any of a plurality of preselected heights, the baking and the cutting being done in a safe, convenient and economical manner.

2. Description of the Prior Art

The use of cake pan/cutting systems of known designs and configurations is known in the prior art. More specifically, cake pan/cutting systems of known designs and configurations previously devised and utilized for the purpose of baking and cutting cakes are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a multi-use pan system that allows for baking a cake of any of a plurality of preselected heights and for cutting the baked cake at any of a plurality of preselected heights, the baking and the cutting being done in a safe, convenient and economical manner.

In this respect, the multi-use pan system according to the present invention substantially departs from the conventional concepts and designs of the prior art, and in doing so provides an apparatus primarily developed for the purpose of baking a cake of any of a plurality of preselected heights and cutting the baked cake at any of a plurality of preselected heights, the baking and the cutting being done in a safe, convenient and economical manner.

Therefore, it can be appreciated that there exists a continuing need for a new and improved multi-use pan system which can be used for baking a cake of any of a plurality of preselected heights and for cutting the baked cake at any of a plurality of preselected heights, the baking and the cutting being done in a safe, convenient and economical manner. In this regard, the present invention substantially fulfills this need.

SUMMARY OF THE INVENTION

In view of the disadvantages inherent in the known types of cake pan/cutting systems of known designs and configurations now present in the prior art, the present invention provides an improved multi-use pan system. As such, the general purpose of the present invention, which will be described subsequently in greater detail, is to provide a new and improved multi-use pan system and method which has all the advantages of the prior art and none of the disadvantages.

To attain this, the present invention essentially comprises a multi-use pan system comprised of a plurality of components. Such components are individually configured and correlated with respect to each other so as to attain the desired objective. In their broadest context such include a primary module, supplemental modules, and a coupling system. In this broad context, first provided is a primary module having a base with a periphery. A base side wall with a lower edge is formed integrally with the periphery of the base. The base side wall has an upper edge. The primary module has a base flange in an annular configuration with an inner edge formed integrally with the upper edge of the base side wall. Supplemental modules each have a supplemental side wall with an upper edge and a lower edge. Each supplemental module has an upper flange and a lower flange. Each upper flange has an inner edge integrally formed with the upper edge of an associated supplemental side wall. Each lower flange has an inner edge integrally formed with the lower edge of the associated supplemental side wall. A coupling assembly secures together the primary module and the supplemental modules during use. Each of the flanges are vertically disposed in axial alignment. The second holes of each of the flanges are vertically disposed in axial alignment. The coupling assembly further includes fasteners. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved multi-use pan system which has all of the advantages of the prior art cake pan/cutting systems of known designs and configurations and none of the disadvantages.

It is another object of the present invention to provide a new and improved multi-use pan system which may be easily and efficiently manufactured and marketed.

It is further object of the present invention to provide a new and improved multi-use pan system which is of durable and reliable constructions.

An even further object of the present invention is to provide a new and improved multi-use pan system which is susceptible of a low cost of manufacture with regard to both materials and labor, and which accordingly is then susceptible of low prices of sale to the consuming public, thereby making such multi-use pan system economically available to the buying public.

Lastly, it is another object of the present invention to provide a multi-use pan system for baking a cake of any of a plurality of preselected heights and for cutting the baked cake at any of a plurality of preselected heights, the baking and cutting being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a multi-use pan system constructed in accordance with the principles of the present invention.

FIG. 2 is a plan view of the multi-use pan system taken along line 2-2 of FIG. 1.

FIG. 3 is a perspective illustration of the multi-use pan system shown in the prior Figures, the system being shown in use with a baked cake being cut.

FIG. 4 is an exploded perspective illustration of the multi-use pan system shown in the prior Figures.

FIG. 5 is an exploded perspective illustration of an alternate embodiment of the invention.

FIG. 6 is a front elevational view of the FIG. 5 embodiment.

FIG. 7 is an exploded perspective illustration of another alternate embodiment of the invention.

FIG. 8 is a perspective illustration of the FIG. 7 embodiment.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved multi-use pan system embodying the principles and concepts of the present invention and generally designated by the reference numeral 10 will be described.

The present invention, the multi-use pan system 10 is comprised of a plurality of components. Such components in their broadest context include a primary module, supplemental modules, and a coupling assembly. Such components are individually configured and correlated with respect to each other so as to attain the desired objective.

The preferred embodiment of the multi-use pan system, designated by the reference numeral 10, is for baking a cake of any of a plurality of preselected heights and for cutting the baked cake at any of a plurality of preselected heights. The baking and the cutting are done in a safe, convenient and economical manner.

First provided is a primary module 14. The primary module has a circular base 16 with a periphery. The circular base is positionable in a horizontal plane. The primary module has a base side wall 18 positionable in a vertical plane. The base side wall has a cylindrical configuration with a lower edge formed integrally with the periphery of the circular base. The base side wall has an upper edge. The primary module has a base flange 20. The base flange is positionable in a horizontal plane. The base flange has an annular configuration with an inner edge formed integrally with the upper edge of the base side wall. The base flange has an outer free edge. The base side wall has a height. The circular base has a diameter. The base flange has a width. The diameter of the circular base is 25 to 35 times the height of the base side wall. The width of the base flange is 1.75 to 2.25 times the height of the base side wall.

Next provided is a plurality of supplemental modules 24. The supplemental modules are similarly configured. Each supplemental module is formed with a supplemental side wall 26 having a cylindrical configuration with an upper edge and a lower edge. Each supplemental module has an upper flange 28 and a lower flange 30. Each upper flange has an inner edge integrally formed with the upper edge of an associated supplemental side wall. Each upper flange has a free outer edge. Each lower flange has an inner edge integrally formed with the lower edge of the associated supplemental side wall. Each lower flange has a free outer edge. Each supplemental side wall has a height essentially equal to the base side wall. The width of each upper flange and each lower flange is essentially equal to the width of the base flange.

Lastly, a coupling assembly is provided. The coupling assembly includes a first hole 34 in the base flange and a second hole 36 in the base flange. The first and second holes in the base flange are diametrically opposed. The coupling assembly includes aligned first holes 40 in the upper and lower flanges of each supplemental module. The coupling assembly includes aligned second holes 42 in the upper and lower flanges of each supplemental module. The first and second holes of each flange are diametrically opposed. The first holes of each of the flanges are vertically disposed and in axial alignment. The second holes of each of the flanges are vertically disposed and in axial alignment. The coupling assembly includes a first bolt 46 extending upwardly through the first hole in the base module and through the first holes of the supplemental modules. The coupling assembly includes a second bolt 48 extending upwardly through the second hole in the primary module and through the second holes of the supplemental modules. A first wing nut 50 is removably coupled to the first bolt. A second wing nut 52 is removably coupled to the second bolt. In this manner, the base module and a preselected number of the supplemental modules may be secured together by the first and second bolts with the side walls of the base and supplemental modules forming a continuous side wall for receiving batter for baking a cake. Also, in this manner, after baking a cake, the bolts may be removed and the supplemental modules individually removed to allow a user to cut and remove an upper portion of the baked cake. Note FIG. 3.

The present invention (1) allows the baking of cakes of various heights, (2) allows the cutting of layers evenly and of multiple thicknesses, (3) may be used as a mold to make even layers of an ice cream cake, and (4) eliminates the need to flip cakes out of a pan as is traditional.

FIG. 5 is an exploded perspective illustration of an alternate embodiment 100 of the invention. FIG. 6 is a front elevational view of the FIG. 5 embodiment. This embodiment is to allow the pan to become water tight by adding high-temperature food grade silicone gaskets 104 between modules and for a handle 108 to become removably attached for stove top use such as for boiling water, making soup, frying, and the like. The stackability of the system allows various depths, can serve as a replacement for the multiple pots and pans that exist in a normal household, and allows for easy portability on camping trips and the like.

More specifically, the high-temperature food grade silicone gaskets 104 have an annular configuration with interior diameters and exterior diameters essentially equal to those of the flanges of the modules. The gaskets are positioned between the modules to abate leakage during use. In addition, each of the flanges has a plurality of apertures 112. The apertures of the flanges are oriented in a first aligned passageway and a second passageway. The passageways extend through the apertures of the modules and the apertures of the flanges. A first bolt 114 and a second bolt 116 extend through the passageways. Further, a wingnut 118 secures the bolts and flanges during operation and use. Lastly, provided is a handle 108, preferably in a Z-shaped configuration. The handle has an interior end with an attachment aperture 120. The first bolt 114 is longer than the second bolt 116 for receipt and securement of the handle to the modules.

FIG. 7 is an exploded perspective illustration of another alternate embodiment of the invention. FIG. 8 is a perspective illustration of the FIG. 7 embodiment. Such embodiment 200 is to allow for the creation of a single tiered cake baked in the upright position by using an adapter between rings of different diameters. Currently, single tiered cakes are made in pans in which the cake is baked upside down, which can cause the cake to break if the cake does not release from the pan when flipping it right side up for removal. Because those prior cakes are baked upside down, the top of the cake bakes first, and it is the smallest part of the cake which can cause it to potentially become overbaked and dry.

In this final embodiment, an adaptor 204 is provided. The adaptor is in an annular configuration with downwardly extending fingers 206 extending vertically from diametrically spaced locations. The adaptor also includes upwardly extending fingers 208 extending vertically from diametrically spaced locations. The downwardly extending fingers are more widely spaced than the upwardly extending fingers. Apertures 212 extend through the flanges of the lower module 214. Apertures 216 extend through the flanges of the lowermost module 218. Apertures 220 extend through the flanges of the upper module 222. The lower module and the lowermost module have diameters greater than the diameter of the upper module. The apertures of both the lower module and the lowermost module are more widely spaced than the apertures of the upper module. In this manner the cake may be baked with upper and lower sections of different diameters.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multi-use pan system comprising:
a primary module having a base with a periphery, the primary module having a base side wall with a lower edge formed integrally with the periphery of the base, the base side wall having an upper edge, the primary module having a base flange in an annular configuration with an inner edge formed integrally with the upper edge of the base side wall;
supplemental modules each having a supplemental side wall with an upper edge and a lower edge, the supplemental modules each having an upper flange and a lower flange, each upper flange having an inner edge integrally formed with the upper edge of an associated supplemental side wall, each lower flange having an inner edge integrally formed with the lower edge of the associated supplemental side wall;
a coupling assembly securing together the primary module and the supplemental modules during use; the coupling assembly including a first set of aligned apertures defining a first passageway in the flanges of each module and a second set of aligned apertures defining a second passageway in the flanges of each module, the coupling assembly including a first bolt extending through the first passageway and a second bolt extending through the second passageway, the first bolt being longer than the second bolt; and
a handle with an interior end, the interior end being formed with an aperture receiving the first bolt to facilitate handling the system.

2. A multi-use pan system comprising:
a primary module having a base with a periphery, the primary module having a base side wall with a lower edge formed integrally with the periphery of the base, the base side wall having an upper edge, the primary module having a base flange in an annular configuration with an inner edge formed integrally with the upper edge of the base side wall;
supplemental modules each having a supplemental side wall with an upper edge and a lower edge, the supplemental modules each having an upper flange and a lower flange, each upper flange having an inner edge integrally formed with the upper edge of an associated supplemental side wall, each lower flange having an inner edge integrally formed with the lower edge of the associated supplemental side wall; and
a coupling assembly securing together the primary module and the supplemental modules during use, the coupling assembly including a first set of aligned apertures defining a first passageway in the flanges of each module and a second set of aligned apertures defining a second passageway in the flanges of each module, and the coupling assembly including a first bolt extending through the first passageway and a second bolt extending through the second passageway; the coupling assembly including high-temperature food grade silicone gaskets located between the modules, the high-temperature food grade silicone gaskets being formed with apertures located in said first and second passageways to abate leakage during use.

3. A multi-use pan system comprising:
a primary module having a base with a periphery, the primary module having a base side wall with a lower edge formed integrally with the periphery of the base, the base side wall having an upper edge, the primary module having a base flange in an annular configuration with an inner edge formed integrally with the upper edge of the base side wall;
supplemental modules each having a supplemental side wall with an upper edge and a lower edge, the supplemental modules each having an upper flange and a lower flange, each upper flange having an inner edge integrally formed with the upper edge of an associated supplemental side wall, each lower flange having an inner edge integrally formed with the lower edge of the associated supplemental side wall; and a coupling assembly securing together the primary module and the supplemental modules during use, the coupling assembly including a first set of aligned apertures in the flanges of each module and a second set of aligned apertures in the flanges of each module, the coupling assembly including an adaptor with downwardly extending fingers extending through sets of aligned apertures there beneath, the coupling assembly including an adaptor with upwardly extending fingers extending through sets of aligned apertures there above, the modules below the adaptor being larger than the modules above the adaptor creating a tier shape, the downwardly extending fingers being more widely spaced than the upwardly extending fingers.

4. A multi-use pan system (10) for baking a cake of any of a plurality of preselected heights and for cutting the baked cake at any of a plurality of preselected heights, the baking and cutting being done in a safe, convenient and economical manner, the system comprising, in combination:

a primary module (14), the primary module having a circular base (16) with a periphery, the circular base being positionable in a horizontal plane, the primary module having a base side wall (18), the base side wall being positionable in a vertical plane, the base side wall having a cylindrical configuration with a lower edge formed integrally with the periphery of the circular base, the base side wall having an upper edge, the primary module having a base flange (20), the base flange being positionable in a horizontal plane, the base flange having an annular configuration with an inner edge formed integrally with the upper edge of the base side wall, the base flange having an outer free edge, the base side wall having a height, the circular base having a diameter, the base flange having a width, the diameter of the circular base being 25 to 35 times the height of the base side wall, the width of the base flange being 1.75 to 2.25 times the height of the base side wall;

a plurality of supplemental modules (24), each of the plurality of supplemental modules being similarly configured, each of the plurality of supplemental modules formed with a supplemental wall (26) having a cylindrical configuration with an upper edge and a lower edge, each of the plurality of supplemental modules having an upper flange (28) and a lower flange (30), each upper flange having an inner edge integrally formed with the upper edge of an associated Supplemental side wall, each upper flange having a free outer edge, each lower flange having an inner edge integrally formed with the lower edge of the associated supplemental side wall, each lower flange having a free outer edge, each supplemental side well having a height essentially equal to the base side wall, each upper flange and each lower flange having a width essentially equal to the width of the base flange; and a coupling assembly, the coupling assembly including a first hole (34) in the base flange and a second hole (36) in the base flange, the first and second holes in the base flange being diametrically opposed, the coupling assembly including aligned first holes (40) in the upper and lower flanges of each supplemental module, the coupling assembly including aligned second hole (42) in the upper and lower flanges of each supplemental module, the first and second holes Of each flange being diametrically opposed, the first holes of each of the flanges being vertically disposed and in axial alignment, the second holes of each of the flanges being vertically disposed and in axial alignment, the coupling assembly including a first bolt (46) extending upwardly through the first hole in the base module and through the first holes of the supplemental modules, the coupling assembly including a second bolt (48) extending upwardly through the second hole in the primary module and through the second holes of the supplemental modules, a first wing nut (50) removably coupled to the first bolt, a second wing nut (52) removably coupled to the second bolt whereby the base module and a preselected number of the supplemental modules may be secured together by the first and second bolts with the side walls of the base and supplemental modules forming a continuous side wall for receiving batter for baking a cake, and whereby, after baking a cake, the bolts may be removed and the supplemental modules individually removed to allow a user to cut and remove an upper portion of the baked cake.

\* \* \* \* \*